Figure 1:
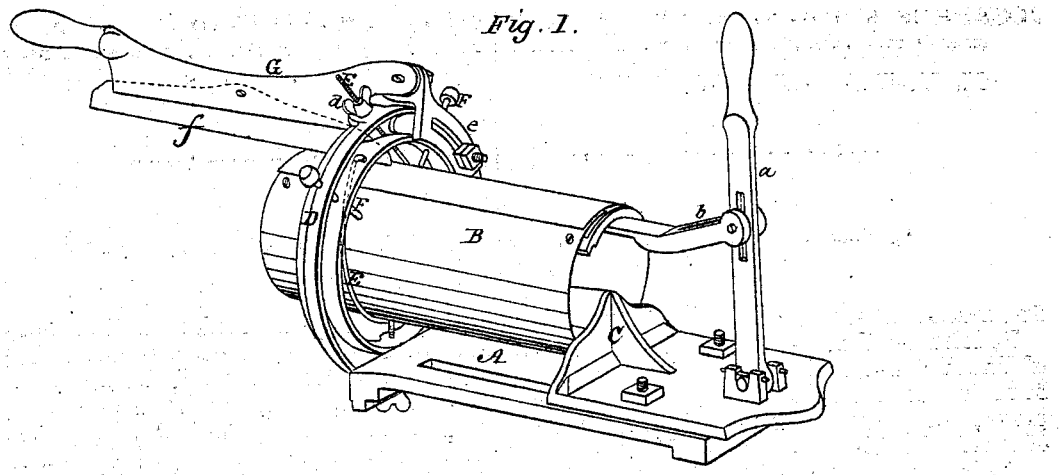

J. REDHEFFER.
Tin-Can Soldering-Machines.

No. 135,847.  Patented Feb. 11, 1873.

Witnesses
Phil. S. Larner
Geo. H. Stenz

Inventor
Josephus Redheffer
By Wm. C. Wood
Attorney

UNITED STATES PATENT OFFICE.

JOSEPHUS REDHEFFER, OF PHILADELPHIA, PENNSYLVANIA, ASSIGNOR TO WM. REDHEFFER, JAMES REDHEFFER, JR., AND THOMAS G. REDHEFFER, OF KANSAS CITY, MISSOURI.

IMPROVEMENT IN TIN-CAN-SOLDERING MACHINES.

Specification forming part of Letters Patent No. 135,847, dated February 11, 1873.

*To all whom it may concern:*

Be it known that I, JOSEPHUS REDHEFFER, of Philadelphia, in the State of Pennsylvania, have invented certain new and useful Improvements in Tin-Can-Soldering Machines, of which the following is a specification:

My improvements relate to that class of machines which are employed to hold the metal in a certain required position while the main seam and the head is being soldered. My invention consists in part of a novel method of mounting the cylinder upon its base, and in so combining and arranging the said cylinder, and an encircling gage-ring, that either or both may be moved in the axial line of the cylinder, whereby the machine is practically adapted for use in the soldering of cans of any length equal to or less than the length of the cylinder. My invention further consists in a novel construction of the soldering bar or gage, whereby the soldering of the main seam can be executed by the workman at any convenient point on the top or side of the cylinder; and also in certain other minor points, whereby the efficiency of the machine is greatly augmented; and I do hereby declare that the following specification, taken in connection with the drawing furnished and forming a part of the same, is a clear and true description of a machine embodying the several and combined features of my invention.

Figure 2:
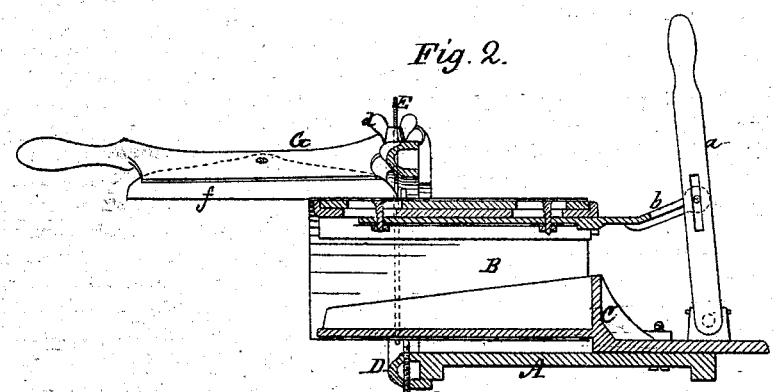
Figure 3:
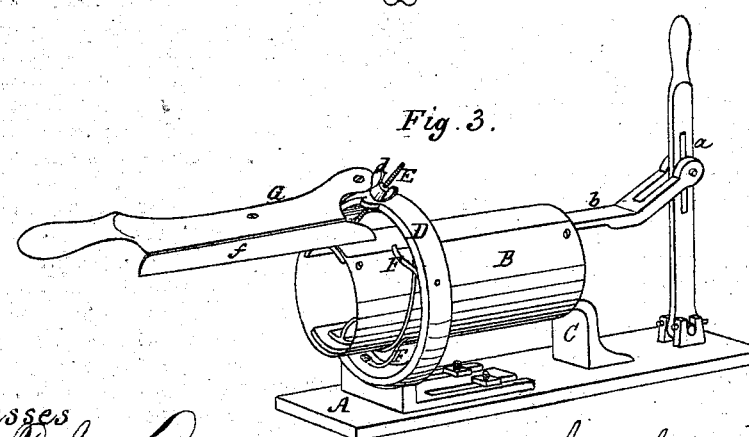

Referring to the drawing, Figure 1 represents one of my machines in perspective. Fig. 2 represents the same in longitudinal section. Fig. 3 represents one of my machines in perspective, slightly differing in construction from that shown in Fig. 1, but embodying as fully as that the spirit of my invention.

A denotes the bed-plate of the machine. It is provided with suitable means by which it may be secured to a work-bench. B denotes the cylinder. In this instance it is rendered expansible by a pair of cam-slots located within, operated by a rod and pin, in substantially the manner described and claimed in the patent issued to Luke A. Smith, dated October 31, 1871, and will therefore require no further explanation in this connection. The cylinder B is open at the rear end. A bracket, C, extends its arm horizontally into the rear end, and the cylinder is riveted thereto on its lower inner side. The base of the bracket C is provided with two bolts, which project through longitudinal slots in the bed-plate A. These bolts are provided with nuts, and by them the bracket and cylinder may be firmly set at any desired point within the length of the slots. The vertical lever $a$ is connected with the rod $b$, which is joined to the expanding and contracting device within the cylinder. D denotes the gage ring or base, from which the devices performing the function of gages project toward the cylinder. This gage-ring is made with an inner diameter greater than that of the cylinder. As shown in Fig. 1, the gage-ring may be fixedly secured to the base-plate A, or cast with it in one piece. In Fig. 3, however, it is represented as if provided with a base, which is longitudinally adjustable on the base-plate A, substantially in the same manner as the bracket C is arranged on the base-plate, and represented in Fig. 1. E denotes an adjustable holding band, which encircles the cylinder. One end is securely attached to the gage-ring at a point adjacent to the fixed end. The free end is joined to the gage-ring by means of a screw-thread on the band, and a thumb-screw, $d$. This band can be made to inclose the cylinder, with more or less intervening space, as may be desired; or, it can be drawn by the thumb-screw into close contact with the cylinder when expanded, so as to firmly bear upon the sides of a can when interposed and ready for soldering. F in each instance denotes a gage-pin. The upper ones may be loosely fitted to radial holes in the gage-ring, so as to rest with their weight upon the exterior of the cylinder, and move in and out radially as the cylinder is contracted or expanded; or they may be provided with screw-threads, and tapped to the holes in the gage-ring. These two methods are shown in Fig. 1. In practice, these gage-pins will sometimes be encircled by expansive spiral springs of light power, so arranged as to at all times force the pins inward against the cylinder. An economical gage-pin and spring combined is exhibited in Fig. 3. It is composed of a single strip of sheet spring-metal riveted at one end to the gage-ring, and so bent and curved inwardly as to constantly bear with but little pressure against the cylinder. It will readily be observed that these several gage-pins, however constructed, perform the same functions, and, when properly set with relation to the outer end of the cylinder, that they will prevent the can-stock from being placed on the cylinder beyond the width of the strip of tin which is used to form the sides of the can. By such accurate adjustment of the can-stock on the cylinder the expansion is properly effected, and the cylinder can never so far project as to prevent the proper application of the bottom or top of the can. G denotes a soldering-bar, which is pivoted at one end to the gage-ring by means of a bolted connection, e, which is provided with a curved slot, whereby the soldering-bar may be set at various points on the gage-ring. The blade f is pivoted at the center to the bar so as to secure a good general bearing of the bar on the can when brought down thereon, to hold the edge of the metal in proper position during the soldering operation.

As heretofore constructed, the bar has been fixedly attached to the gage-ring, either at the top or slightly down on one side. Some tinners can operate at better advantage while soldering if the solder-line is on the line of the cylinder than they can if it be on top, while the reverse is true with others. It is also often desirable for the tinner to vary the position of the soldering-bar from time to time, by which the attitude of the workman may be correspondingly varied, and undue or excessive fatigue thereby avoided.

The operation of my machine resembles that of machines in existence prior to my invention, in expanding and contracting the cylinder, and in holding the seam-edge by the soldering-bar. Prior to my invention, however, I am not aware that a can-soldering machine was ever constructed in which the gage-ring or its equivalent and the expansive cylinder were adjustable with relation to each other, whereby cans of various lengths could be readily soldered thereon. I therefore do not confine myself to the precise construction and arrangement of gage-ring and cylinder herein shown and described, for I am well aware that it does not matter whether the cylinder be movable longitudinally with relation to the gage-ring, or the structure which supports the several gage-pins, as shown in Fig. 1, or whether the gage-ring be movable and the cylinder stationary, as shown in Fig. 3, or whether the gages and the cylinder be both movable, the result will be the same, and the differences can only involve variations in the expense of manufacture or the durability of parts. For some reasons, especially on large heavy machines, the cylinder will be preferably mounted upon a bracket cast solid with the bed-plate; the gage-ring or its equivalent device in such case should be made adjustable on the bed-plate, as shown in Fig. 3. I am also well aware that the construction of the gage-ring and pins may be largely varied, and I therefore do not confine myself to the precise gage-ring described. The gage-ring properly performs merely the function of a base or sustaining structure for the gage-pins, and such a base can readily be made with such a form as would preclude the technical propriety of calling it a "ring," and yet possess the desirable characteristics of the "gage-ring," as shown.

Having thus described my invention, I claim as new and desire to secure by Letters Patent—

1. The combination of a can-soldering cylinder and a gage-base or ring, either or both of which are adjustable with relation to the other, substantially as described, whereby the machine is practically adapted to the soldering of cans of different lengths.

2. The combination, with the expanding and contracting cylinder, of the gage-pins arranged to bear upon the surface of the cylinder, and to maintain proper contact therewith at all times, substantially as and for the purposes specified.

3. The soldering-bar G, secured to its base at its fulcrum by a connection which is adjustable on the circumferential line of the cylinder, substantially as described, whereby the bar may be brought at will to bear at different points on the cylinder, as and for the purposes specified.

JOSEPHUS REDHEFFER.

Witnesses:
W. HARRISON FAY,
WM. H. THORNLEY.